(12) United States Patent
Jaeker et al.

(10) Patent No.: US 11,462,893 B2
(45) Date of Patent: Oct. 4, 2022

(54) LINE-GUIDING DEVICE

(71) Applicant: igus GmbH, Cologne (DE)

(72) Inventors: Thilo-Alexander Jaeker, Sankt Augustin (DE); Andreas Hermey, Hennef (DE)

(73) Assignee: IGUS GMBH, Cologne (DE)

( * ) Notice: Subject to any disclaimer, the term of this patent is extended or adjusted under 35 U.S.C. 154(b) by 375 days.

(21) Appl. No.: 16/499,519

(22) PCT Filed: Mar. 22, 2018

(86) PCT No.: PCT/EP2018/057245
§ 371 (c)(1),
(2) Date: Sep. 30, 2019

(87) PCT Pub. No.: WO2018/177862
PCT Pub. Date: Oct. 4, 2018

(65) Prior Publication Data
US 2020/0044425 A1    Feb. 6, 2020

(30) Foreign Application Priority Data

Mar. 31, 2017   (DE) .................... 20 2017 101 896.2

(51) Int. Cl.
*H02G 3/04*    (2006.01)
*H02G 11/00*   (2006.01)

(52) U.S. Cl.
CPC .......... *H02G 3/0475* (2013.01); *H02G 11/00* (2013.01)

(58) Field of Classification Search
CPC ........ H02G 3/04; H02G 3/0475; H02G 11/00; H02G 11/006
See application file for complete search history.

(56) References Cited

U.S. PATENT DOCUMENTS 4,840,023 A * 6/1989 Borsani ................ H02G 11/006
59/78.1
5,824,957 A * 10/1998 Holshausen ......... H02G 3/0475
174/95

(Continued)

FOREIGN PATENT DOCUMENTS

| CN | 101680510 | 3/2010 |
| CN | 102449867 | 5/2012 |

(Continued)

OTHER PUBLICATIONS

English translation of International Search Report from corresponding PCT Appln. No. PCT/EP2018/057245, dated Jun. 25, 2018.

(Continued)

*Primary Examiner* — Paresh Paghadal
(74) *Attorney, Agent, or Firm* — Grossman, Tucker, Perreault & Pfleger, PLLC

(57) ABSTRACT

A cable-routing device, the members of which have central joint bodies for articulation to one another, which comprise a joint head and a joint socket. The joint head has an axial region in which the cross-section thereof has a peripheral geometry with at least two corner points and lateral lines which connect the latter to one another, the lateral lines which meet at a corner point forming an internal angle of less than 180°, and the joint socket has a receiving region which geometrically corresponds to the axial region of the joint head and into which the joint head can lock.

16 Claims, 5 Drawing Sheets

(56) References Cited

U.S. PATENT DOCUMENTS

| | | | |
|---|---|---|---|
| 7,845,155 B2 | 12/2010 | Jaeker | |
| 8,397,480 B2 | 3/2013 | Jaeker et al. | |
| 10,444,459 B2 * | 10/2019 | Haataja | G02B 6/44 |
| 10,680,421 B2 * | 6/2020 | Ruebel | H02G 3/0475 |

FOREIGN PATENT DOCUMENTS

| | | |
|---|---|---|
| CN | 205533751 | 8/2016 |
| DE | 20305487 | 6/2003 |
| DE | 20305680 | 7/2003 |
| DE | 20317827 | 3/2005 |
| DE | 102010032920 | 2/2012 |
| EP | 1160948 | 12/2001 |
| EP | 1193819 | 4/2002 |
| WO | 96/35887 | 11/1996 |

OTHER PUBLICATIONS

English translation of the Written Opinion from corresponding PCT Appln. No. PCT/EP2018/057245, dated Jun. 25, 2018.
Office Action from related Chinese Appln. No 201880023444.3 dated Apr. 24, 2020 English translation of Search Report attached.

* cited by examiner

LINE-GUIDING DEVICE

FIELD

The present invention relates to a line-guiding device composed of members, open at their end faces and connected to one another in an articulated manner, which are arranged one behind the other in the longitudinal direction of the line-guiding device and form, by means of radially outer guide elements, a guide channel for receiving and guiding energy and/or information cables, wherein the members each have inside the guide channel a central joint body for the articulated connection of immediately adjacent members, which joint body comprises a joint head and a joint socket having an opening for insertion of the joint head of an immediately adjacent member, wherein the joint socket comprises a first receiving region in which the joint head inserted therein of an immediately adjacent member is secured against rotation about the longitudinal axis of the line-guiding device, and wherein immediately adjacent members can be angled relative to the longitudinal axis of the line-guiding device in at least two different angular planes.

The radially outer guide elements can extend around the central joint body in an arcuate or rectangular manner and be connected to the joint body by webs. The guide elements of immediately adjacent members can be arranged at a distance from one another or can overlap so that they form a closed, tubular line-guiding device even when members are angled relative to one another.

The joint head of a joint body is to be capable of being locked in the joint socket of an immediately adjacent member, so that the articulated connection is able to absorb tensile forces acting thereon.

BACKGROUND

A line-guiding device of the type mentioned at the beginning is known from WO 96/35887. In the exemplary embodiment shown in FIG. 6 of that publication, the spherical joint head comprises radially outwardly protruding pins which are guided in a rotationally fixed manner in guide slots of the joint socket of an adjacent member which are open to the edge. Owing to the pins guided in the guide slots, which pins form a cross pin on the spherical joint head, the articulated connection between two adjacent members permits angling in two angular planes perpendicular to one another.

The anti-rotation structure known from the mentioned publication has the disadvantage that, in the case of torques acting on the articulated connections about the longitudinal axis of the line-guiding device, relatively small lateral surfaces of the pins and contact surfaces of the guide slots must absorb the torques, and the anti-rotation structure is therefore susceptible to wear in the case of relatively large torques acting on the articulated connections. Furthermore, the lateral wall of the joint socket is interrupted in the region of its receiving region for the joint head by the guide slot, which must have a sufficient width to receive the pins constituting the anti-rotation structure. The tongues of the joint socket, which are spaced apart according to the diameter of the pins, may spread when high tensile forces act on the articulated connection, so that the articulated connection in some circumstances does not have sufficient stability. Moreover, when the members are assembled, precise adjustment of the pins of the joint head of a member in relation to the guide slot in the joint socket of an adjacent member is necessary.

SUMMARY

The object underlying the present invention is to improve the articulated connection between the joint head of one member and the joint socket of an immediately adjacent member of a line-guiding device, wherein the immediately adjacent members can be angled in at least two different angular planes and the joint head inserted into the joint socket is secured against rotation about the longitudinal axis of the line-guiding device.

The above object is achieved according to the invention in that the joint head comprises an axial region relative to the longitudinal axis of the line-guiding device in which the cross-section of the joint head has a peripheral geometry with at least two vertices and lateral lines connecting the vertices together, wherein for all the vertices of the peripheral geometry the lateral lines meeting at a vertex enclose an internal angle of less than 180°, and the joint socket comprises a first receiving region corresponding geometrically to the axial region of the joint head, in which receiving region the joint head can be locked, such that the joint head of an immediately adjacent member seated with the axial region in the first receiving region of the joint socket of a member is arranged non-rotatably therein and can be angled in at least two different angular planes.

The cross-sectional geometry of the joint head and of the receiving region of the joint socket having at least two vertices and lateral lines connecting the vertices together makes possible an anti-rotation structure in which surfaces extending substantially over the entire periphery of the joint head and of the receiving region of the joint socket are in contact with one another and absorb torques about the axes of the articulated connections between adjacent members. As a result of the extensive contact, wear caused by torques is avoided to the greatest possible extent. Furthermore, the cross-sectional geometry permits self-adjustment of the joint head in relation to the receiving region of the joint socket, since the forces acting on the vertices of the joint head as a result of resilient widening of the opening of the joint socket on insertion of the joint head guide the vertices along the lateral lines of the receiving region to the vertices thereof.

The cross-sectional geometries of the receiving region of the joint socket and of the axial region of a joint head seated in the joint socket can correspond to one another along the entire axial region. The cross-sectional geometries can also be similar to one another in such a manner that there is a small amount of play between the receiving region of the joint socket and a joint head, seated therein, of an adjacent member. Alternatively, the cross-sectional geometries can also be similar in such a manner that the joint head of an adjacent member is seated in the receiving region of the joint socket with a slight interference fit.

The vertices of the cross-sectional geometry of the joint head and of the receiving region of the joint socket can form continuous edges over the height of the axial region, between which there extend in the height direction of the axial region convexly curved, in particular arcuate, surfaces.

The central joint bodies are preferably formed such that immediately adjacent members can be angled in any desired angular planes which have the longitudinal axis of the line-guiding device in common.

The joint bodies can be formed in one piece with the joint head and the joint receiver, in particular injection molded from plastics material. The guide elements extending radially peripherally around the central joint body can be molded onto the central joint body via webs, for example by injection molding. In order to take account of particular requirements, for example as regards resilience, hardness, of the individual components of a member, the members can also be produced by the multi-component injection molding process.

The joint body of a member preferably comprises the joint head in one axial end region and the joint socket in its other axial end region. The joint head can be connected to the joint socket via a neck having a smaller diameter.

The opening of the joint socket for insertion of the joint head can be arranged at the axial end face of the central joint body having the first receiving region.

The inside of the edge region of the opening can have a peripheral geometry which is similar in the geometrical sense to that of the adjacent first receiving region, wherein it has a narrowing relative to the first receiving region. At the end face of the joint socket, the inside of the edge region of the opening can widen conically outwards in relation to the peripheral geometry of the first receiving region of the joint socket, for the purpose of easier introduction and for the possible self-adjustment of the joint head.

The vertices of the peripheral geometry of the axial region of the joint head are preferably distributed evenly over the peripheral geometry.

Furthermore, the lateral lines connecting the vertices together are preferably convexly curved.

In particular, all the lateral lines connecting the vertices together can have the same radius of curvature.

The radius of curvature of the lateral lines connecting the vertices together is then larger than the radius of the smallest circle enclosing the vertices and the lateral lines. In particular, the radii can be in a ratio of from 5/4 to 15/4.

The peripheral geometry of the cross-section of the joint head preferably comprises in the axial region at least three vertices, in particular three or four vertices.

The vertices can be rounded such that the lateral lines adjoining them merge into one another substantially continuously with a small radius of curvature.

In a preferred embodiment, the first receiving region of the joint socket corresponding geometrically to the axial region of the joint head is slotted from the opening in the axial direction in the region of at least one vertex. The slot can have a negligible width and serves merely to allow the edge region of the opening and the adjacent first receiving region of the joint socket to spread resiliently on insertion of the joint head. In particular when the lateral lines of the cross-sectional geometry connecting the vertices together are convexly curved, a torque acts on the correspondingly convexly curved lateral surfaces of the joint head, owing to the resilient forces, when the joint head is inserted into the opening of the joint socket and not adjusted according to the peripheral geometry of the inside of the edge region of the opening and the adjacent receiving region of the joint socket. The torque can in this case effect self-adjustment to the peripheral geometry of the inside of the edge region of the opening and of the adjacent first receiving region of the joint socket.

In a further development of the invention, the joint socket of a member of the line-guiding device can have a second receiving region adjacent to the first receiving region in the direction facing away from the opening of the joint socket, into which second receiving region the joint head of an immediately adjacent member can be engaged from the first receiving region, wherein the two members are in such a form that their angling relative to one another is blocked in at least one angling direction when the joint head is seated in the second receiving region of the joint socket.

The second receiving region can be separated from the first receiving region by an overlapping region, the inside diameter of which is smaller than the largest outside diameter of the joint head. The inside diameter of this narrowing is preferably larger than the inside diameter of the narrowing on the inside of the edge region of the opening of the joint socket, in order to remove the joint head from the locking connection with the second receiving region with a smaller force than the force that is required to remove the joint head from the first receiving region.

For removing the joint head from the locking connection with the first receiving region of the joint socket, one or more recesses which are open at their end faces can be provided in the edge region of the joint socket, through which recesses there can be introduced a tool which engages with one end on the joint head seated in the joint socket and can lever the end region of the joint socket with the internal narrowing outwards, in order to remove the joint head more easily from the joint socket.

The joint head preferably comprises a neck with an outside diameter that is smaller relative to the joint head, which neck is connected via a conically widened region to the joint socket, wherein the conically widened region comprises a cross-sectional geometry which is similar in the geometrical sense to that of the first receiving region of the joint socket, and that cross-sectional geometry corresponds to that of the outwardly conically widened region of the opening of the joint socket. The joint bodies of the members are then in such a form that, on introduction of the joint head of a member into the second receiving region of the joint socket of an immediately adjacent member, the conically widened region adjacent to the neck of the joint head cooperates with the outwardly conically widened region of the opening of the joint socket, on account of their mutually corresponding cross-sectional geometry, and secures the joint body against rotation in that connected position.

Alternatively, or in addition, securing against rotation in that position can be effected in that the second receiving region, and optionally also the narrowed transition region between the first and second receiving regions of the joint socket, have a cross-sectional geometry similar to that of the first receiving region.

The line-guiding device according to the invention is designed in particular for receiving and guiding energy and/or information cables in the furniture sector, in particular in the case of office furniture. However, it can be used generally in the building sector and in engineering, for example in robotics, in particular also for supplying energy and/or information to movable machine parts or units.

BRIEF DESCRIPTION OF THE DRAWINGS

Two exemplary embodiments of the present invention will be described in greater detail hereinbelow with reference to the drawing.

In the drawing.

DETAILED DESCRIPTION

Figure 1:
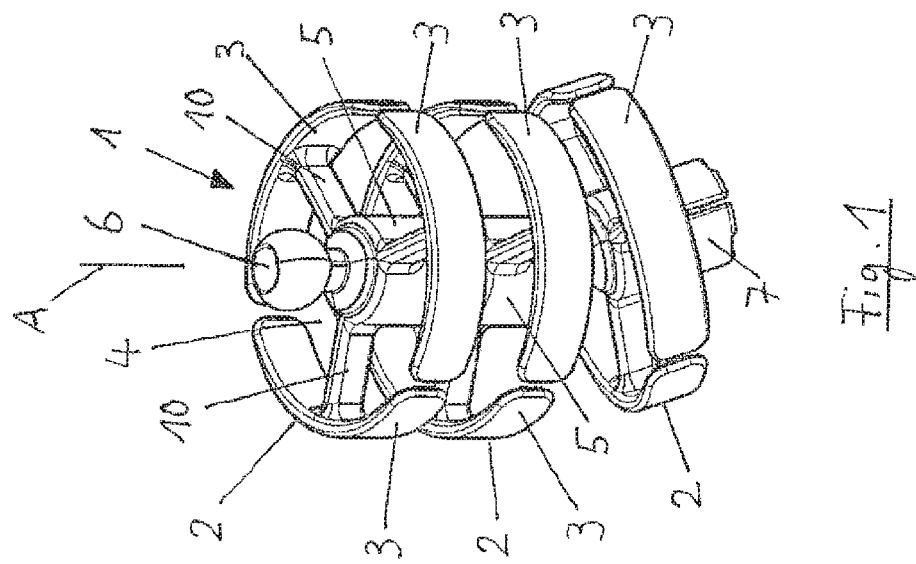
FIG. 1 is a perspective view of a portion of a line-guiding device comprising three members.

As is apparent from the portion of a line-guiding device 1 shown in FIG. 1, the device is composed of members 2, connected to one another in an articulated manner and open at their end faces, which are arranged one behind the other in the longitudinal direction of the line-guiding device and form, by means of radially outer guide elements 3, a guide channel 4 for receiving and guiding energy and/or information cables which are not shown in the drawing.

The members 2 each have inside the guide channel 4 a central joint body 5 for the articulated connection of immediately adjacent members 2, which joint body comprises a joint head 6 and a joint socket 7 having an opening 8 for insertion of the joint head 6 of an immediately adjacent member 2.

As is apparent in particular from FIG. 3, the joint socket 7 comprises a first receiving region 9 in which, as will be explained hereinbelow, the joint head 6 inserted therein of an immediately adjacent member 2 is secured against rotation about the longitudinal axis of the line-guiding device 1. In this position shown by the bottom two members in FIGS. 1 to 3, the two members can be angled relative to one another in any desired angling direction planes which have the longitudinal axis A of the line-guiding device in common.

As is likewise shown in FIGS. 1 to 4 and also 6 and 7, three arcuate guide elements 3 extend around the central joint body 5, which guide elements are connected to the joint body 5 by webs 10.

Figure 3:
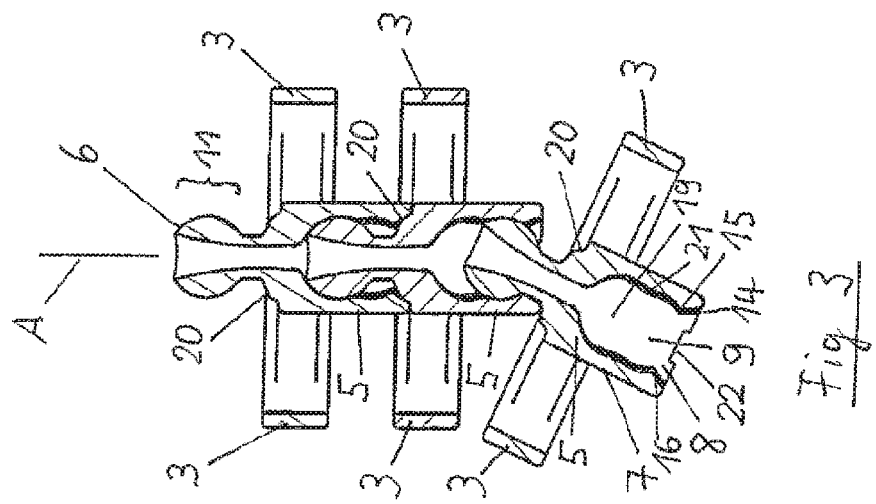
FIG. 3 is a longitudinal section through the portion of a line-guiding device shown in FIG. 2, parallel to the plane of the drawing.
Figure 2:
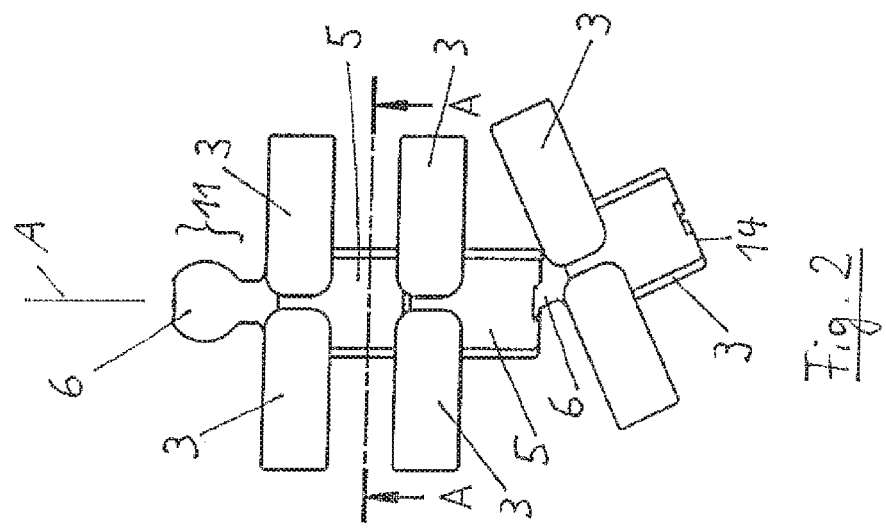
FIG. 2 is a side view of the portion of a line-guiding device shown in FIG. 1.

The joint head 6 of the member 2 shown at the bottom in FIGS. 1 to 3 is locked in the first receiving region 9 of the joint socket 7 of the member 2 arranged above it, in such a manner that it is secured against removal from the first receiving region 9.

As is more clearly apparent from FIGS. 4 to 10 of the drawing, the joint head 6 comprises an axial region 11 relative to the longitudinal axis A of the line-guiding device 1, in which the cross-section of the joint head 6 (see FIG. 9) has a peripheral geometry with at least two vertices 12 and lateral lines 13 connecting the vertices together, wherein for all the vertices 12 of the peripheral geometry the lateral lines 13 meeting at a vertex 12 enclose an internal angle of less than 180°. The peripheral geometry of the joint head 6 in the axial region 11 corresponds to the peripheral geometry of the first receiving region 9 of the joint socket 7 such that the joint head 6 of the member arranged at the bottom in FIGS. 1 to 3 seated with the axial region 11 in the first receiving region 9 of the joint socket 7 of a member 2 is arranged therein in such a manner that it is not rotatable about the longitudinal axis A of the line-guiding device 1 and can be angled relative to the member 2 arranged above it in any desired angling direction planes.

Figure 9:
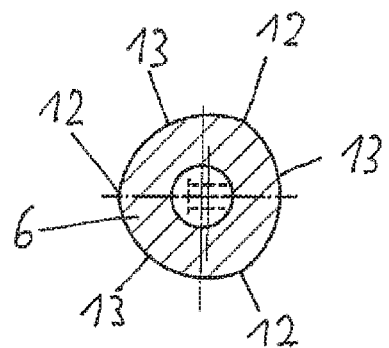
FIG. 9 is a section along line D-D in FIG. 8.

In the exemplary embodiment in question, the peripheral geometry of the joint head 6, which is apparent in particular from FIG. 9, comprises three vertices 12 distributed evenly over the peripheral geometry. The vertices 12 are connected together by convexly curved lateral lines of equal length. The radius of curvature of the convexly curved lateral lines 13 is larger than the radius of the smallest circle enclosing the vertices 12 and the lateral lines 13.

Figure 5:
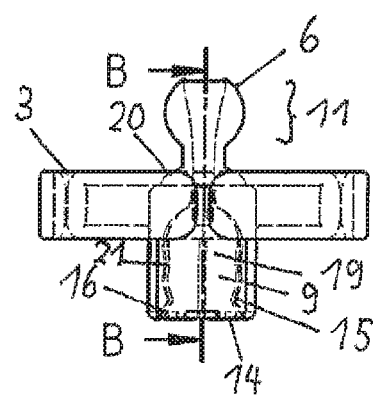
FIG. 5 is a side view of a member with concealed lines shown by broken lines.
Figure 6:
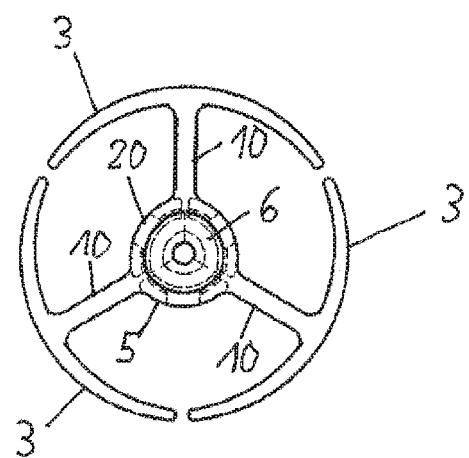
FIG. 6 is an end view from above of the member shown in FIG. 5.
Figure 8:
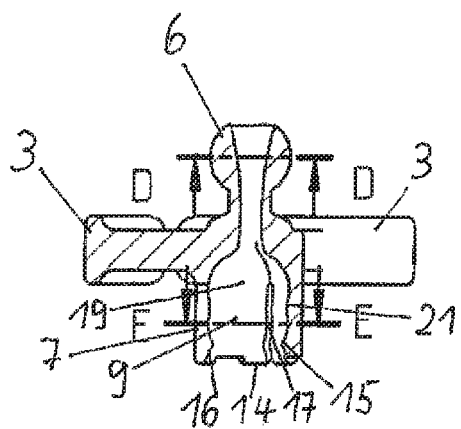
FIG. 8 is a section along line B-B in FIG. 5.

As is apparent in particular from FIGS. 5 and 8, the joint body 5 of a member 2 comprises the joint head 6 in one axial end region and the joint socket 7 in its other axial end region. The joint head 6 is connected to the joint socket 7 via a neck having a smaller diameter.

The opening 8 of the joint socket 7 for insertion of the joint head 6 of an immediately adjacent member 2 is arranged at the axial end face 14 of the central joint body 5 having the first receiving region 9. The inside of the edge region 15 of the opening 8 has a peripheral geometry which is similar in the geometrical sense to that of the first receiving region 9 adjacent thereto, wherein it includes a narrowing 15 relative to the first receiving region 9. At the axial end face 14 of the joint socket 7, the inside has a conically widened region 16 extending outwards from the narrowing 15, which region permits simple introduction of the joint head 6 into the first receiving region 9 of the joint socket 7 and consequent self-adjustment of the joint head 6 in relation to the peripheral geometry of the first receiving region 9 of the joint socket 7.

Figure 7:
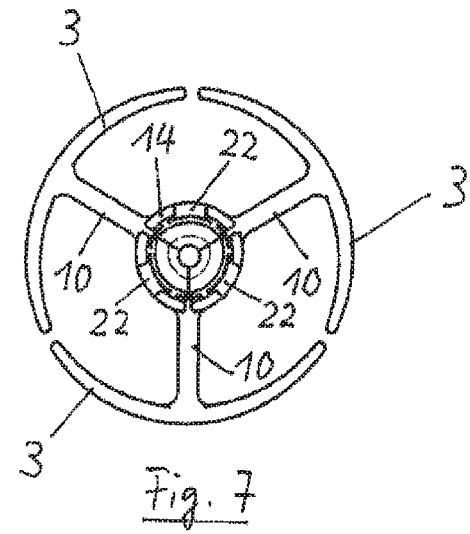
FIG. 7 is an end view from beneath of the member shown in FIG. 5.
Figure 4:
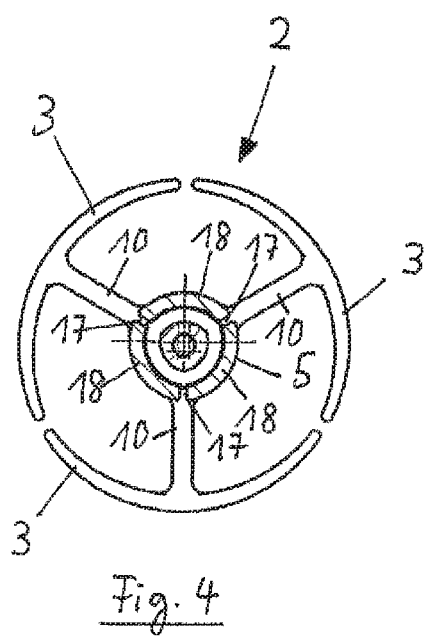
FIG. 4 is a section along line A-A in FIG. 2.
Figure 10:
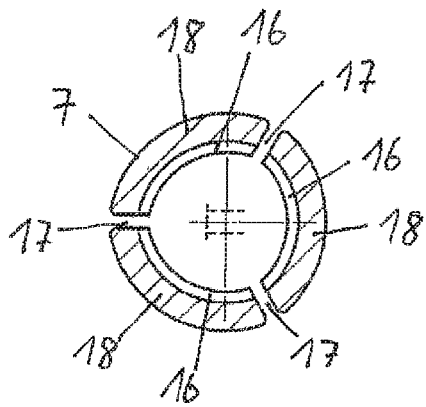
FIG. 10 is a section along line E-E in FIG. 8.

As is apparent in particular from FIGS. 7, 8 and 10, the joint socket 7 is slotted in the region of the corner edges of its axial receiving region 9 defined by the vertices 12 of the cross-sectional geometry. The width of the slots 17 is governed merely by manufacture by injection molding and can be kept as small as possible. The slots 17 divide the slotted region of the joint socket 7 into three tongues 18, which spread resiliently on insertion of the joint head 6 of an immediately adjacent member 2 into the joint socket 7. Owing to the resilient restoring forces, a torque acts on the lateral surfaces of the joint head 6 which are convexly curved corresponding to the cross-sectional geometry, when the joint head 6 is inserted into the opening 8 of the joint socket 7 and is not adjusted according to the peripheral geometry of the inside of the edge region of the opening 8 and the adjacent first receiving region 9 of the joint socket 7. In this case, the torque effects self-adjustment of the joint head 6 and of the joint socket 7 about the longitudinal axis A of the line-guiding device 1 to the cross-sectional geometry common thereto.

As is further apparent from FIGS. 3, 5 and 8, the joint socket 7 of a member 2 of the line-guiding device 1 comprises a second receiving region 19 adjacent to the first receiving region 9 in the direction facing away from the opening 8 of the joint socket 7, in which second receiving region the joint head 6 of an immediately adjacent member 2 can be engaged from the first receiving region 9. The central joint bodies 5 of the members 2 are formed such that angling of immediately adjacent members relative to one another is blocked in every direction when the joint head 6 is seated in the second receiving region 19 of the joint socket 7, as is shown in FIGS. 1 to 3 for the top two members 2.

In order in that position likewise to secure the two immediately adjacent members 2 against rotation relative to one another about the longitudinal axis A, the neck of the joint head 6 is connected via a conically widened region 20 to the joint socket 7, the outer shape of which is cylindrical. The conically widened region 20 has a cross-sectional geometry with respect to the longitudinal axis of the joint socket 7 which is similar in the geometrical sense to that of the first receiving region 9 of the joint socket 7 and corresponds to the cross-sectional geometry of the outwardly widened region 16 of the opening 8 of the joint socket 7.

Securing against rotation in that position can additionally be effected in that the second receiving region 19 and also the narrowed transition region 21 between the first and second receiving regions of the joint socket 7 have a cross-sectional geometry which is similar in the geometrical sense to the cross-sectional geometry of the axial region 11 of the joint head 5.

The inside diameter of the narrowed transition region 21 between the first and second receiving regions of the joint socket 7 is slightly larger than the inside diameter of the narrowing 15 on the inside of the edge region of the opening 8 of the joint socket 7, in order to remove the joint head 6 from the locking connection with the second receiving region 19 with a smaller force than the force that is required to remove the joint head 6 from the first receiving region 9.

For removing the joint head 6 from the locking connection with the first receiving region 9 of the joint socket 7, recesses 22, open at their end faces, are provided in the edge region of the tongues 18 of the joint socket 7, through which recesses there can be introduced a tool, not shown in the drawing, which engages the joint head 6 seated in the joint socket 7 with one end and is able to lever outwards the end region of the respective tongue 18 with the inner narrowing 15 in order to remove the joint head 6 more easily from the joint socket 7.

In the drawing, FIGS. 11 to 17 show a second exemplary embodiment of members 2 which, as in FIG. 1 of the first exemplary embodiment described above, can be assembled to form a line-guiding device.

In contrast to the first exemplary embodiment, the guide elements 5 extending around the central joint body 5 are in rectangular form, wherein in each case two guide elements 3 are connected together and are molded onto the central joint body 5 via a web 10. The two webs 10 are arranged in alignment with one another and molded at radially opposite points on the central joint body 5.

This provides a slightly different peripheral geometry of the central joint body and also of the first and in part second receiving region of the joint socket 7 including the transition region 21 between the two receiving regions, of the narrowing 15 adjacent to the first receiving region 9 in the direction towards the axial end face 14 of the joint socket 7, and of the adjacent outwardly widened region 16.

Figure 16:
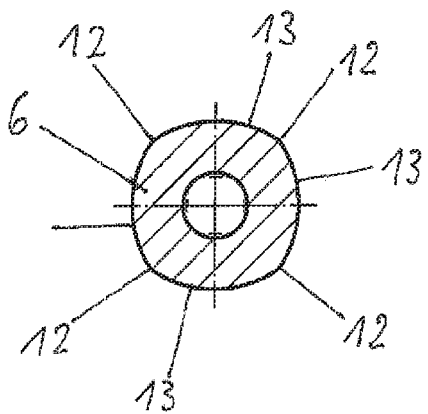
FIG. 16 is a section along line F-F in FIG. 15.
Figure 15:
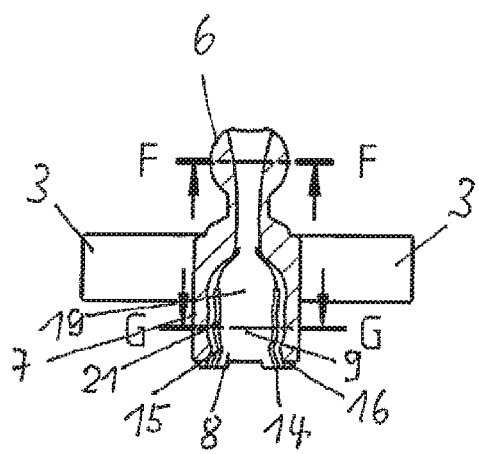
FIG. 15 is a section along line C-C in FIG. 12.
Figure 17:
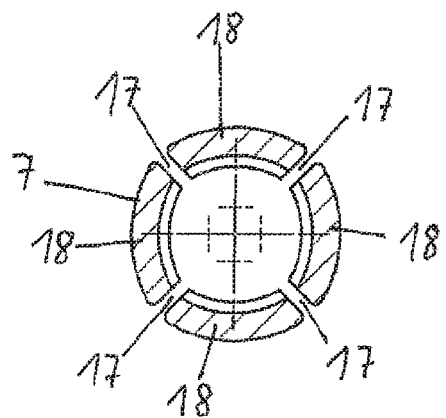
FIG. 17 is a section along line G-G in FIG. 15.

As is apparent in particular from FIGS. 16 and 7, the peripheral geometry comprises four regular vertices 12, which are connected together by convexly curved lateral lines 13 of equal curvature. The radius of curvature of the lateral lines 13 is again larger than the radius of the smallest circle enclosing the vertices 12 and the lateral lines 13.

Figure 14:
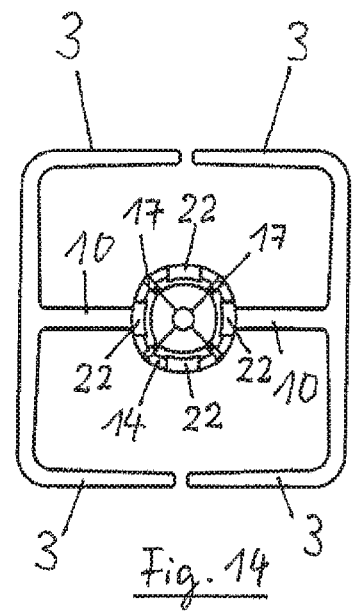
FIG. 14 is an end view from beneath of the member shown in FIG. 12.
Figure 11:
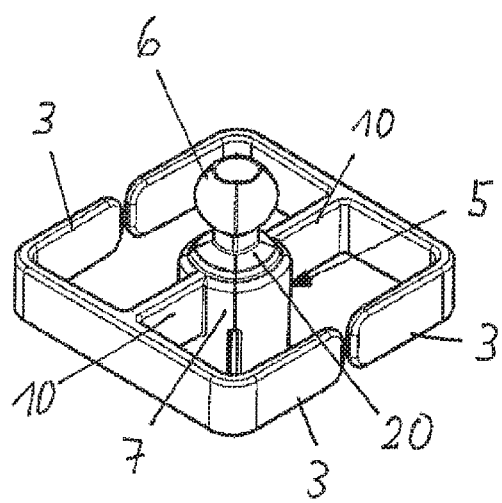
FIG. 11 shows a second embodiment of a member of a line-guiding device.
Figure 12:
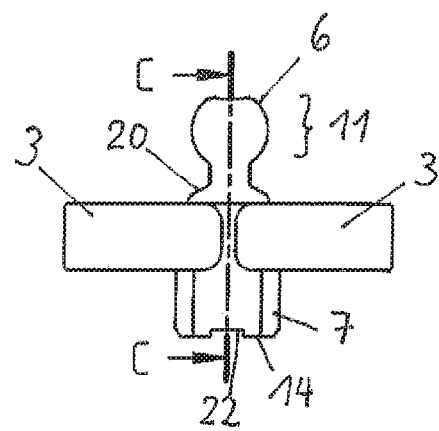
FIG. 12 is a side view of the member shown in FIG. 11.
Figure 13:
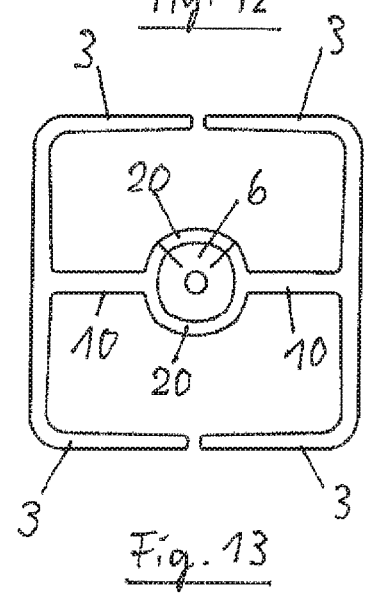
FIG. 13 is an end view from above of the member shown in FIG. 12.

Advantageously, the webs 10 connecting the central joint body 5 to the guide elements 3 are molded in the middle region of the outer sides of two opposite sides of the joint socket 7, which again are in the form of tongues 18, as is apparent in particular from FIGS. 11, 13 and 14.

LIST OF REFERENCE NUMERALS

1 line-guiding device
2 member
3 guide element
4 guide channel
5 joint body
6 joint head
7 joint socket
8 opening
9 first receiving region
10 web
11 axial region
12 vertex
13 lateral line
14 axial end face
15 narrowing
16 widened region
17 slot
18 tongue
19 second receiving region
20 widened region
21 transition region
22 recess
A longitudinal axis of the line-guiding device

What is claimed is:
1. A line-guiding device, comprising:
    members, connected to one another in an articulated manner and open at their end faces, which are arranged one behind the other in a longitudinal direction of the line-guiding device and form, by radially outer guide elements, a guide channel for receiving and guiding energy and/or information cables,
    wherein the members each have inside the guide channel a central joint body for the articulated connection of immediately adjacent members, which joint body comprises a joint head and a joint socket having an opening for insertion of the joint head of an immediately adjacent member of the immediately adjacent members,
    wherein the joint socket comprises a first receiving region in which the joint head inserted therein of the immediately adjacent member of the immediately adjacent members is secured against rotation about the longitudinal axis of the line-guiding device, and
    wherein the immediately adjacent members are angleable relative to the longitudinal axis of the line-guiding device in at least two different angling planes,
    wherein the joint head comprises an axial region relative to the longitudinal axis of the line-guiding device in which the cross-section of the joint head comprises a peripheral geometry with at least two vertices and lateral lines connecting the vertices together,
    wherein, for all the vertices of the peripheral geometry, the lateral lines meeting at a vertex enclose an internal angle of less than 180°, and the joint socket comprises a first receiving region corresponding geometrically to the axial region of the joint head, in which receiving region the joint head are lockable, so that the joint head of the immediately adjacent member of the immediately adjacent members seated with the axial region in the first receiving region of the joint socket of another member of the immediately adjacent members is arranged non-rotatably therein and is angleable in at least two different angular planes.
2. The line-guiding device according to claim 1, wherein the central joint bodies are formed such that the immediately adjacent members are angleable in any desired angular planes which have the longitudinal axis of the line-guiding device in common.

3. The line-guiding device according to claim 1, wherein the central joint bodies are formed in one piece, in particular are injection molded from plastics material.

4. The line-guiding device according to claim 1, wherein the joint body of a member comprises the joint head in one axial end region and the joint socket in its other axial end region.

5. The line-guiding device according to claim 4, wherein the opening of the joint socket for insertion of the joint head is arranged at the axial end face of the central joint body having the first receiving region of the joint socket.

6. The line-guiding device according to claim 1, wherein the inside of the edge region of the opening has a peripheral geometry which is similar in the geometrical sense to that of the adjacent first receiving region, wherein it comprises a narrowing relative to the first receiving region.

7. The line-guiding device according to claim 1, wherein the vertices of the peripheral geometry of the joint head are distributed evenly over the peripheral geometry.

8. The line-guiding device according to claim 1, wherein the lateral lines connecting the vertices together are convexly curved.

9. The line-guiding device according to claim 8, wherein all the lateral lines connecting the vertices together have the same radius of curvature.

10. The line-guiding device according to claim 9, wherein the radius of curvature of the lateral lines connecting the vertices together is larger than the radius of the smallest circle enclosing the vertices and the lateral lines.

11. The line-guiding device according to claim 1, wherein the peripheral geometry of the cross-section of the joint head in the axial region comprises at least three vertices, in particular three or four vertices.

12. The line-guiding device according to claim 1, wherein the first receiving region, corresponding geometrically to the axial region of the joint head, the joint socket is slotted from the opening in the axial direction in the region of at least one corner edge defined by the vertices.

13. The line-guiding device according to claim 1, wherein the joint socket comprises a second receiving region adjacent to the first receiving region in the direction facing away from the opening of the joint socket, in which second receiving region the joint head of the immediately adjacent member of the immediately adjacent members are engageable from the first receiving region, wherein the two members are formed such that angling thereof relative to one another is blocked in at least one angling direction when the joint head is seated in the second receiving region of the joint socket.

14. The line-guiding device according to claim 13, wherein the second receiving region is separated from the first receiving region by a transition region, an inside diameter of the transition region is smaller than a largest outside diameter of the joint head and larger than an inside diameter of a narrowing on an inside of an edge region of the opening of the joint socket.

15. The line-guiding device according to claim 13, wherein the joint head comprises a neck with a smaller diameter relative to the joint head, which neck is connected to the joint socket via a conically widened region, wherein the conically widened region has a cross-sectional geometry which is similar in the geometrical sense to that of the first receiving region of the joint socket, and that cross-sectional geometry corresponds to that of the outwardly conically widened region of the opening of the joint socket.

16. The line-guiding device according to claim 15, wherein the narrowed transition region between the first and second receiving regions of the joint socket and at least one region of the second receiving region of the joint socket adjacent to the transition region has a cross-sectional geometry which is similar in the geometrical sense to that of the first receiving region.

* * * * *